United States Patent
Miyazaki et al.

(10) Patent No.: US 6,341,862 B1
(45) Date of Patent: *Jan. 29, 2002

(54) COLOR FILTER, METHOD OF PRODUCING THE SAME AND LIQUID CRYSTAL DISPLAY DEVICE

(75) Inventors: Takeshi Miyazaki, Ebina; Katsuhiro Shirota, Kawasaki; Koichiro Nakazawa, Tokyo; Akihiko Yamada, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/623,539

(22) Filed: Mar. 29, 1996

(30) Foreign Application Priority Data

Mar. 31, 1995 (JP) ............................................ 7-074981
Mar. 22, 1996 (JP) ............................................ 8-065676

(51) Int. Cl.⁷ ............................ G03F 9/00; G03F 1/13
(52) U.S. Cl. ........................... 347/106; 349/107; 430/7
(58) Field of Search ........................... 347/1, 106, 107, 347/8; 349/106, 107, 891; 430/7, 25, 27

(56) References Cited

U.S. PATENT DOCUMENTS

| | | | | |
|---|---|---|---|---|
| 4,313,124 A | | 1/1982 | Hara ...................... 346/140 R |
| 4,345,262 A | | 8/1982 | Shirato et al. ........... 346/140 R |
| 4,459,600 A | | 7/1984 | Sato et al. ............... 346/140 R |
| 4,463,359 A | | 7/1984 | Ayata et al. ................. 346/1.1 |
| 4,558,333 A | | 12/1985 | Sugitani et al. ......... 346/140 R |
| 4,608,577 A | | 8/1986 | Hori ........................ 346/140 R |
| 4,723,129 A | | 2/1988 | Endo et al. .................. 346/1.1 |
| 4,740,796 A | | 4/1988 | Endo et al. .................. 346/1.1 |
| 4,904,056 A | * | 2/1990 | Castleberry ................. 350/333 |
| 4,929,060 A | * | 5/1990 | Sugimoto et al. ........... 349/107 |
| 5,095,379 A | * | 3/1992 | Fukunaga et al. ............ 359/68 |
| 5,179,457 A | * | 1/1993 | Hirataka et al. .............. 359/73 |
| 5,230,972 A | * | 7/1993 | Jeong et al. ................... 430/7 |
| 5,395,678 A | * | 3/1995 | Matsushima et al. ......... 430/25 |
| 5,398,126 A | | 3/1995 | Takao et al. ................... 359/68 |
| 5,439,582 A | * | 8/1995 | Oka et al. ....................... 430/7 |
| 5,493,429 A | * | 2/1996 | Kanemoto et al. ............ 359/68 |
| 5,503,952 A | * | 4/1996 | Suzuki et al. .................. 430/7 |
| 5,548,424 A | * | 8/1996 | Takao et al. ................. 349/106 |
| 5,561,011 A | * | 10/1996 | Miyazaki et al. ............... 430/7 |
| 5,563,011 A | * | 10/1996 | Shipley ......................... 430/7 |
| 5,568,293 A | * | 10/1996 | Takao et al. ................. 349/106 |
| 5,955,226 A | * | 9/1999 | Matsuda et al. ............... 430/25 |
| 6,025,898 A | * | 2/2000 | Kashiwazaki et al. ......... 430/7 |

FOREIGN PATENT DOCUMENTS

| | | |
|---|---|---|
| JP | 54056847 | 5/1979 |
| JP | 59123670 | 7/1984 |
| JP | 59138461 | 8/1984 |
| JP | 60071260 | 4/1985 |
| JP | 188801 | 7/1989 |
| JP | 181216 | 6/1992 |
| WO | WO 21400 | 8/1995 |

* cited by examiner

Primary Examiner—Peter S. Wong
Assistant Examiner—Bao Q. Vu
(74) Attorney, Agent, or Firm—Fitzpatrick, Cella, Harper & Scinto

(57) ABSTRACT

The present invention relates to a color filter having a plurality of colored members as pixel portions which are formed by using dots of a plurality of color inks having different spectral characteristics. Light transmitting ink dots other than the color ink dots are respectively formed on the pixel portions.

21 Claims, 4 Drawing Sheets

COLOR FILTER, METHOD OF PRODUCING THE SAME AND LIQUID CRYSTAL DISPLAY DEVICE

BACKGROUND OF THE INVENTION

1. Field of the Invention

The present invention relates to a color filter, a method of producing the same, and a liquid crystal display device provided with the color filter.

2. Related Background Art

Recently, research and development of liquid crystal display devices as flat display panels have extended steadily, and the market of the liquid crystal displays is has been significantly scaled up.

Component materials used for forming a liquid crystal display device are roughly divided into a polarizing plate, a glass substrate, an oriented film, a liquid crystal material, spacers, a color filter, etc.

Of these materials, the color filter is relatively high cost and thus said to be a key point for enabling supply of a liquid crystal display device at a reasonable cost.

The color filter of a liquid crystal display device comprises a plurality of colored members having different levels of light transmittance, generally red (R), green (G) and blue (B) colored members, which are provided on a transparent substrate, each of the colored members functioning as a pixel.

Shield members are provided between respective pixels in order to increase display contrast. The shield members are generally known as a "black matrixm" because the members are black. The black matrix is also provided on the substrate side opposite to the color filter.

The black matrix is generally formed by etching a chromium metal deposited film or sputtered film. The methods of forming the colored members which respectively form pixels include the method of dyeing a dyeable medium which is formed by photolithography, the method using a pigment-dispersed photosensitive composition, the electrodeposition method using a electrode pattern, and the low-cost method using an ink-jet process.

The method of producing the color filter by using the ink-jet process comprises simple production steps and is economically advantageous, as compared with conventional methods of producing color filters.

When a color filter comprising a plurality of colored members having different degrees of light transmission is formed, for example, inks of three colors R, G and B having different compositions are discharged for coloring.

However, this method frequently has the problem of causing height differences between the colored members (so-called height differences between colors) which respectively form R, G and B colors and which comprise ink dots. This is due to the fact that when the spectral characteristics of each of the R, G and B color inks are optimized, particularly, when an ink absorbing layer is used as an undercoat layer (ground layer), the undercoat layer swells depending upon the types and amounts of the coloring agents of R, G and B colors contained in the inks.

When a liquid crystal display device is assembled by using a color filter having such height differences between colors, the problem of inevitably deteriorating image quality occurs unless special attention is given to a protective film or the like. In general, an active matrix liquid crystal panel is required to have evenness of not more than 0.3 $\mu$m, and particularly a simple matrix liquid crystal panel is required to have evenness of not more than 0.1 $\mu$m.

As a method of solving this problem, a method has been proposed in which height differences are decreased by coating an evening layer on color pixel portions. However, with large height differences between colors, it is necessary to increase the thickness of the evening layer or forming a multilayer. In this case, this method possibly brings about the problem of decreasing transmittance.

SUMMARY OF THE INVENTION

Accordingly, an object of the present invention is to solve the above problems and provide a color filter having small height differences between respective color pixels, a method of producing the color filter having small height differences between colors at low cost, and a liquid crystal display device exhibiting high image quality.

Another object of the present invention is to provide a color filter requiring no thick evening layer and exhibiting high transmittance.

In order to solve the problems and achieve the objects of the present invention, in accordance with an embodiment of the present invention, there is provided a color filter comprising a plurality of colored members as pixel portions which are formed by using dots of a plurality of color inks having different spectral characteristics, wherein light transmitting ink dots other than the color ink dots are respectively formed on the pixel portions.

The present invention includes a method of producing the color filter, and a liquid crystal display device provided with the color filter.

In accordance with another embodiment of the present invention, there is provided a method of producing the color filter comprising at least the steps of forming dots of a plurality of color inks having different spectral characteristics on a substrate by an ink jet method to form a plurality of pixel portions, and forming light transmitting ink dots other than the color ink dots on the pixel portions.

In accordance with a further embodiment of the present invention, there is provided a liquid crystal display device comprising a first substrate on which the color filter of the present invention is provided, a second substrate having electrodes opposite to the first substrate, and a liquid crystal material disposed between the first and second substrates.

The aforementioned technical problems can be solved and the above objects can be achieved by the color filter, the method of producing the color filter and the liquid crystal display device provided with the color filter of the present invention.

Namely, since the color filter of the present invention has the light transmitting ink dots other than the color ink dots, which are respectively formed on the pixel portions formed by using the color ink dots, it is possible to remove or significantly decrease the height differences between respective pixels having different colors. This can remove or significantly prevent deterioration in image quality which is caused by height differences between colors. The color filter of the present invention also enables achievement of high transmittance because of no need for an evening film.

The method of producing the color filter of the present invention is capable of providing an optimum color filter at a low cost.

DETAILED DESCRIPTION OF THE PREFERRED EMBODIMENT

The present invention is described in detail below with reference to the drawings.

Figure 1:
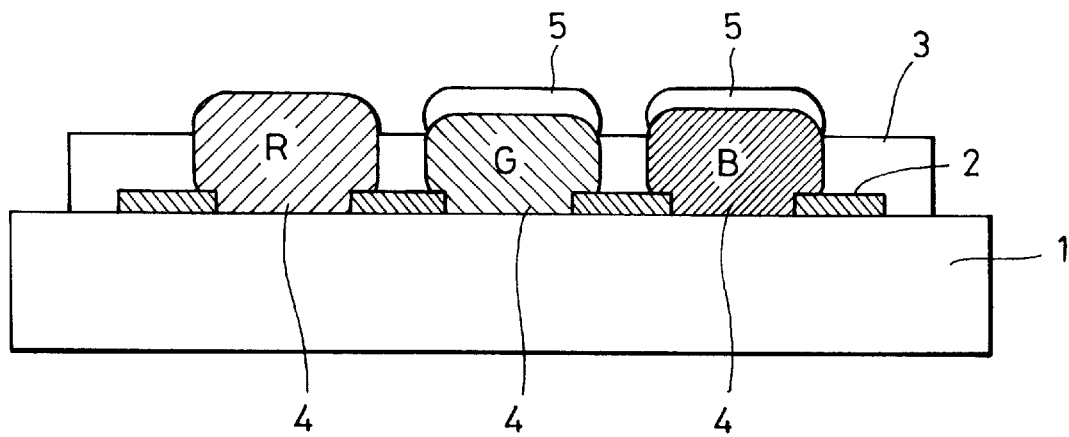
FIG. 1 is a schematic partially sectional view illustrating a color filter in accordance with an embodiment of the present invention.

FIG. 1 is a schematic view illustrating a color filter in accordance with an embodiment of the present invention. In FIG. 1, reference numeral 1 denotes a light transmitting substrate comprising glass or the like; reference numeral 2, a black matrix comprising a metal or black resist; reference numeral 3, an undercoat layer; reference numeral 4, color ink dots; and reference numeral 5, light transmitting ink dots.

Although dots of a plurality of color inks having different spectral characteristics must be formed, the color inks are not limited to the R (red), G (green) and B (blue) color inks shown in FIG. 1, and other color inks can be used. The color filter of the present invention is characterized in that the light transmitting ink dots 5 other than dots 4 of a plurality of the color inks having different spectral characteristics, which are formed on pixel regions, are formed on the pixel regions so as to remove or decrease height differences between the respective pixels.

Although glass is generally used as material for the transparent substrate of the filter shown in FIG. 1, any plastics having characteristics required for a liquid crystal color filter, such as transparency, mechanical strength, etc. can be used, and the substrate is not limited to the glass substrate.

A coloring solution is ejected on the transparent substrate by the ink jet recording process of ejecting ink droplets from an ink jet recording head, and then dried to form color ink dots of each color. In this case, in order to further improve the fixing properties of the coloring solution, the undercoat layer 3 comprising an ink absorbing resin or the like may be previously provided as a receiving layer for receiving the coloring solution.

Preferable examples of such ink absorbing resins include polyvinyl alcohol, polyvinyl pyrrolidone, cellulose derivatives such as hydroxypropyl cellulose and the like, acrylic resins and the like. The ink absorbing resin can be formed in a matrix on color portions or over the entire surface of the substrate.

Resins which can be selectively cured can be used as the ink absorbing resin. Curing can generally be performed by irradiation of light, but it can also be performed by heating. Examples of photosensitive resins include acrylic resins, epoxy resins, silicone resins, cellulose derivatives such as hydroxypropyl cellulose, hydroxyethyl cellulose, methyl cellulose, carboxymethyl cellulose and the like, modified products thereof and the like. Of these resins, acrylic copolymer resins containing monomers such as acrylic acid, methyl acrylate, ethyl acrylate, hydroxyethyl methacrylate, N-methylol acrylamide, N-ethoxymethyl acrylamide and the like are preferred.

As a photo-initiator for initiating crosslinking reaction when only light or both light and heat are supplied to the resin, bichromate, a bisazide compound, a radical initiator, a cationic initiator, an anionic initiator or the like can be used. These initiators can also be used in a mixture thereof or combination with another sensitizer. An optical acid generator such as an onium salt can also be used in combination with a crosslinking agent.

It is preferable to use a photosensitive resin which exhibits poor wettability and absorption for an aqueous color ink in a region (cured region) where crosslinking region proceeds, and excellent wettability and absorption for an aqueous color ink in a unreacted region (uncured region).

Figure 2A:
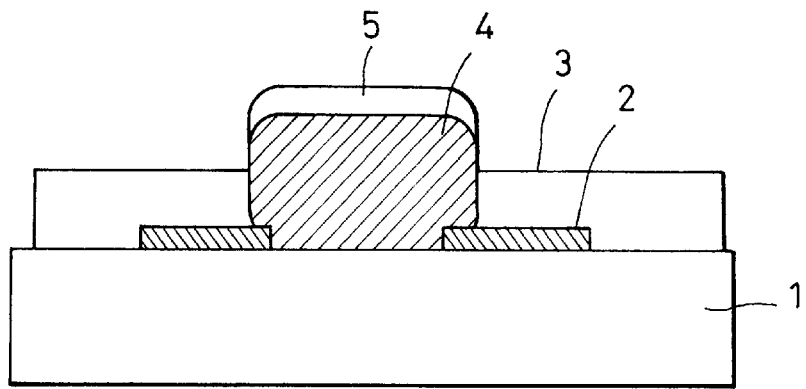
FIGS. 2(a) and 2(b) are a schematic partially sectional views of a color filter in which a light transmitting ink dot is formed on a coloring pixel portion by a method of the present invention, FIG. 2(a) showing the case wherein the ink dot is formed only on the coloring pixel portion, and FIG. 2(b) showing the case wherein the ink dot is formed to cover not only the coloring pixel portion but also the vicinity there
Figure 2B:
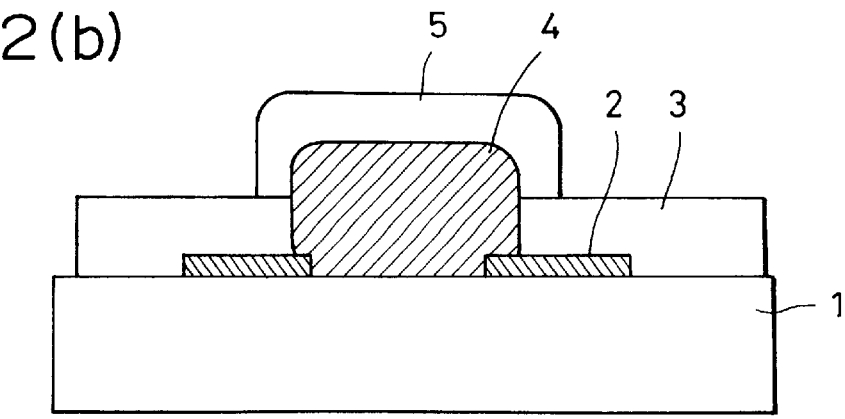

The light transmitting ink dots 5 are formed by the ink jet recording process of ejecting droplets of a transparent resin ink on the color ink dots 4 from an ink jet recording head, and then drying the ink dots. Each of the light transmitting ink dots may be formed on a color ink dot, as shown in FIG. 2(a), or formed on a color ink dot and the surrounding region thereof.

In order to provide the color ink dots at a uniform height from the undercoat layer, it is preferable to appropriately change the thickness of the light transmitting ink dot formed on each of the color ink dots in accordance with the height of the color ink dot. The thicknesses of the light transmitting ink dots formed are preferably set so that the height differences between respective color pixels (height differences between colors) are not more than 0.3 $\mu$m. If the height differences between colors exceed this value, image quality deteriorates even in an active matrix type (TFT) liquid crystal display device. The height differences are more preferably not more than 0.1 $\mu$m because sufficient image quality can be obtained even when the invention is applied to a simple matrix liquid crystal panel which is required to have high evenness. The light transmitting ink dots may be formed on only part of the color ink dots.

The light transmitting ink dots preferably have transmittance of at least about 90% within the visible region (400 nm to 700 nm).

The transparent resin ink for forming the light transmitting ink dots can be formed by dissolving a transparent polymer such as acrylic resin, styrene resin, cellulose resin, polyester resin, polyamide resin or the like in water or an organic solvent such as ethyl Cellosolve.

A photo-initiator (crosslinking agent) such as an azide compound or bichromate can also be used for progressing crosslinking reaction of the resin by using light or both light and heat.

A protective film may be formed on the transparent substrate or the undercoat layer on which the colored layer is formed, if required. As the protective film, a photo-curable type, heat-curable type or photo and heat curable type resin material film, or an inorganic film formed by deposition or sputtering can be used, and any films which have transparency when used in a color filter and which can resist the process for forming an oriented film can be used.

Figure 3:
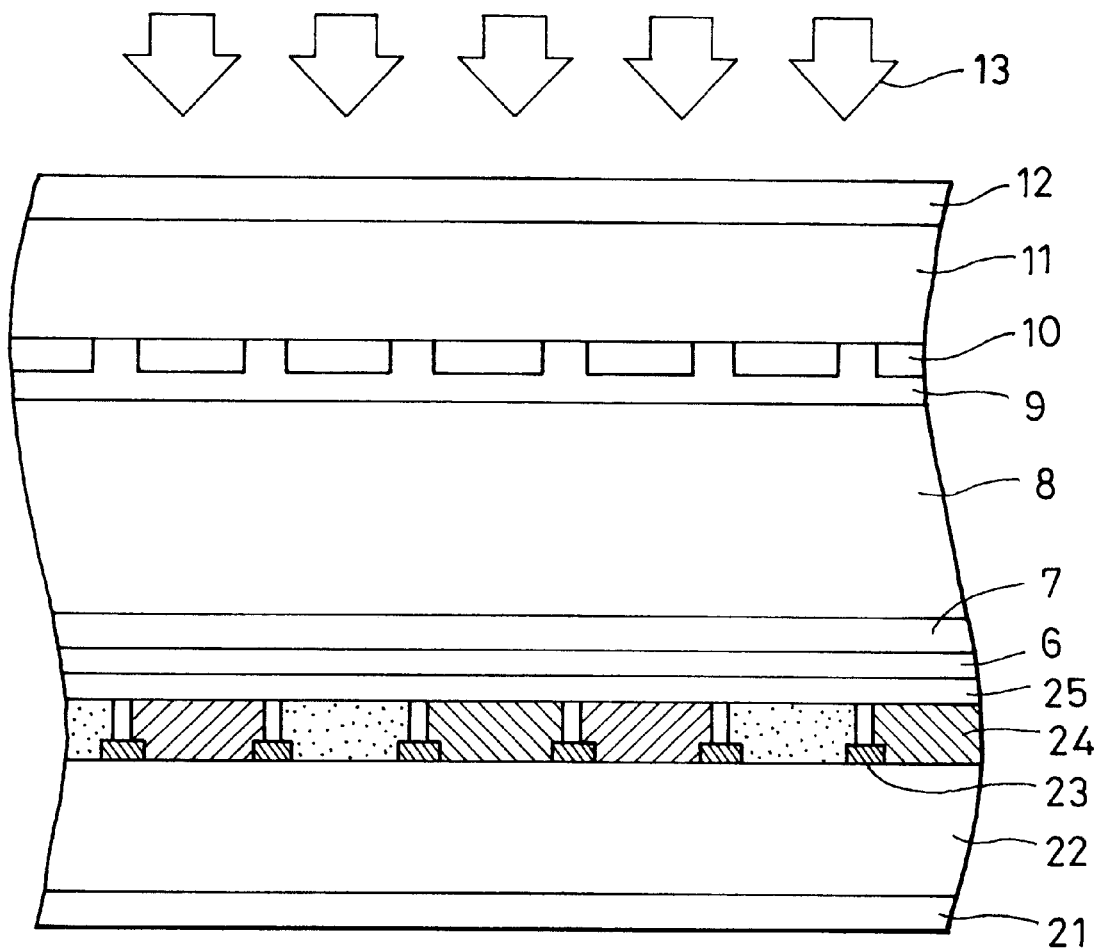
FIG. 3 is a schematic sectional view of a liquid crystal display device in accordance with another embodiment of the present invention.

FIG. 3 shows an example of a liquid crystal panel of a liquid crystal display device comprising the color filter of the present invention. In FIG. 3, reference numeral 21 denotes a polarizing plate; reference numeral 22, a transparent substrate comprising glass or the like; reference numeral 23, a black matrix; reference numeral 24, an undercoat layer; reference numeral 6, a common electrode; reference numeral 7, an oriented film; reference numeral 8, a liquid crystal layer; reference numeral 9, an oriented film; reference numeral 10, pixel electrodes; reference numeral 11, a transparent substrate; reference numeral 12, a polarizing plate; and reference numeral 13, backlight.

The liquid crystal panel shown in FIG. 3 is a so-called active matrix type. In such a liquid crystal panel, a liquid crystal compound is sealed between the color filter and the counter substrate 11, which are assembled into the liquid crystal panel, and the transparent pixel electrodes 10 are formed in a matrix on the inner side of the substrate 11 opposite to the color filter, as shown in FIG. 3. Transistors (not shown) serving as switches are connected to the pixel electrodes 10. The color filter is provided so that R, G and B coloring materials are respectively opposed to the pixel electrodes 10.

The oriented films 7 are formed on the inner sides of both substrates 11 and 22 so that liquid crystal molecules can be oriented in a predetermined direction by rubbing the films 7. The polarizing plates are respectively bonded to the outer sides of the substrates, the liquid crystal compound being held between both substrates. A combination of a fluorescent lamp and a scattering plate (both are not shown) is generally used as the backlight 13. In display, the liquid crystal compound functions as an optical shutter for changing the transmittance of the backlight 13.

FIG. 3 shows an example in which the color filter of the present invention is provided on the side of the counter substrate opposite to the active matrix substrate. However, the color filter of the present invention can also be provided on the side of the active matrix substrate.

When the color filter is provided on the active matrix substrate, the color filter can be provided between the pixel electrodes 10 and the transparent substrate 10 or between the pixel electrodes 10 and the liquid crystal layer 8. When the color filter is provided on the active matrix substrate, there is the advantage that accuracy of register with the counter substrate is relieved.

The color filter of the present invention is formed by a mechanical method which employs piezo element or a thermal method which employs a heating element, using an ink jet recording head, preferably using an ink jet recording head of the type in which droplets are formed by employing heat energy.

The basic principle disclosed in, for example, U.S. Pat. Nos. 4,723,129 and 4,740,796 is preferably used as the typical construction and principle of the ink jet recording head. This system can be applied to a so-called on-demand type or continuous type apparatus. In particular, the on-demand type is effective because heat energy is generated in an electro-thermal converter which is disposed opposite to a sheet containing a liquid (ink) and liquid passage by applying, to the electro-thermal converter, at least one driving signal for rapidly increasing the temperature above the temperature of the nuclear boiling in correspondence with recording information, to produce film boiling in the thermal action surface of the recording head. As a result, bubbles are formed in the liquid (ink) in one-to-one correspondence with the driving signal. The liquid (ink) is discharged from a discharge opening due to the growth and contraction of the bubble to form at least one droplet. The driving signal in a pulse form is more preferable because the bubble is instantaneously and appropriately grown and contracted, thereby achieving discharge of the liquid (ink) with excellent responsiveness.

The driving signals disclosed in U.S. Pat. Nos. 4,463,359 and 4,345,262 are suitable as such pulse-formed driving signals. More excellent recording can be performed by employing the conditions disclosed in the invention of U.S. Pat. No. 4,313,124 which relates to the rate of temperature rise of the thermal action surface.

The present invention includes not only the structure of the recording head comprising the combination of a discharge opening, a liquid passage (a linear liquid passage or a right angle liquid passage) and an electro-thermal converter, as disclosed in each of the above applications, but also the structures disclosed in U.S. Pat. Nos. 4,558,333 and 4,459,600 in which a thermal action portion is disposed in a bent region.

The invention is also effective for structures based on the structure disclosed in Japanese Patent Laid-Open No. 59-123670 in which a common slit is provided as a discharge portion for a plurality of electro-thermal converters, and the structure disclosed in Japanese Patent Laid-Open No. 59-138461 in which an opening for absorbing the pressure wave of thermal energy is provided opposite to a discharge portion.

Further, the present invention can effectively be applied to a full-line type recording head having a length corresponding to the maximum width of recording media on which the recording apparatus can record images. Such a recording head may comprise a combination of a plurality of recording heads which satisfy the length of the recording head, or a single recording head which is integrally formed.

The present invention is also effective for the use of an exchangeable chip type recording head which permits electrical connection to the apparatus body and supply of ink from the apparatus body when being mounted thereon, or a cartridge type recording head having an ink tank which is provided integrally with the recording head.

It is also preferable to add as components discharge recovery means for the recording head, preliminary auxiliary means and the like to the recording apparatus of the present invention because the effects of the invention can further be stabilized. Examples of such means for performing stable discharge include capping means for the recording head, cleaning means, pressure or suction means, preheating means for heating by using an electro-thermal converter or another heating element or a combination thereof, and pre-discharge means for discharging ink separately from recording.

The ink used as the coloring solution in the production process of the present invention may be an ink which is liquid at room temperature or an ink which is solidified at room temperature or lower and softened or liquid at room temperature. In the ink jet system, since the temperature of the ink itself is generally controlled within the temperature range of from 30 to 70° C. so that the viscosity of the ink is within a stable discharge range, an ink which is liquid when the recording signal is applied may be used.

The present invention can also be applied to the use of an ink which is not liquified until heat energy is applied thereto by positively using a temperature rise due to heat energy as the energy for changing a solid state to a liquid state of the ink or using an ink which is solidified when being allowed to stand for preventing evaporation of the ink. Examples of such inks include an ink which is liquefied by applying heat energy in correspondence with the recording signal and discharged in a liquid state or an ink which has already started to solidify when reaching the substrate. In this case, the ink may be held in a liquid or solid state in recesses or through holes of a porous sheet opposite to an electro-thermal converter, as disclosed in Japanese Patent Laid-Open Nos, 54-56847 and 60-71260. In the present invention, the above-described film boiling system is most effective for each of the above inks.

EXAMPLES

The present invention is described in detail below with reference to examples.

Example 1

A chromium thin film was formed to a thickness of about 2000 Å on alkali-free glass (a 200-mm square, thickness 1.1 mm) having a polished surface, and a lattice-formed black matrix comprising shielding members was formed on the glass by photolithography.

On the glass substrate on which the black matrix was formed, was coated an acrylic copolymer-containing photosensitive resin composition which was an ethyl Cellosolve solution having the composition below and containing a polymer formed by using methyl methacrylate, hydroxyethyl methacrylate and N-methylol acrylamide, and triphenylsulfonium hexafluoroantimonate, to form a resin layer.

Specifically, the photosensitive composition was coated by a spinner and then pre-baked at 90° C. for 20 minutes to form the photosensitive resin layer as an undercoat layer having a thickness of 2 μm.

| Photosensitive resin composition | |
|---|---|
| Methyl methacrylate | 5.0 parts by weight |
| Hydroxyethyl methacrylate | 3.0 parts by weight |
| N-methylol acrylamide | 2.0 parts by weight |
| Triphenylsulfonium hexafluoroantimonate | 0.3 part by weight |
| Ethyl Cellosolve | 89.7 parts by weight |

The photosensitive resin layer was then partially subjected to pattern exposure through a photomask having openings in a region where the black matrix should be formed, and then heated on a hot plate at 120° C. for 1 minute. In this step, the resin layer was partially cured.

Color inks respectively having R, G and B colors which had the compositions shown in Table 1 were prepared, and arranged in the openings of the black matrix by ink jet heads. Specifically, ink dots were formed, pre-baked at 90° C. for 20 minutes and then baked at 230° C. for 30 minutes.

TABLE 1

| Color | Component | Parts by weight (%) |
|---|---|---|
| R (red) | Red dye[1] | 6.5 |
| | Ethylene glycol | 20 |
| | Isopropyl alcohol | 5 |
| | Water | 68.5 |
| G (green) | Green dye[2] | 4.1 |
| | Ethylene glycol | 20 |

TABLE 1-continued

| Color | Component | Parts by weight (%) |
|---|---|---|
| | Isopropyl alcohol | 5 |
| | Water | 70.9 |
| B (blue) | Blue dye[3] | 5 |
| | Ethylene glycol | 20 |
| | Isopropyl alcohol | 5 |
| | Water | 70 |

[1] A mixture of C.I. Pigment Red 35 and C.I. Acid Yellow 23 at a ratio of 11:5
[2] A mixture of C.I. Acid Blue 9 and C.I. Acid Yellow 23 at a ratio of 7:2
[3] A mixture of C.I. Acid Blue 9 and C.I. Acid Red 35 at a ratio of 9:1

After baking, the height of each of the colored portions provided on the photosensitive resin was measured by the method which will be described below.

A light transmitting ink having the composition shown in Table 2 was then prepared, and ejected to color pixel portions from an ink jet head to form light transmitting ink dots on the R, G and B colored pixel portions so that the dry thicknesses of the R, G and B colored portions are 0.05 μm, 0.31 μm and 0.27 μm, respectively.

TABLE 2

| Component | Parts by weight (%) |
|---|---|
| Ethylene glycol | 10 |
| Diethylene glycol | 15 |
| Styrene-maleic acid resin monoethanolamine salt (average molecular weight; 30000, acid value; 300) | 2 |
| Water | 70 |
| Isopropyl alcohol | 3 |

After the ink dots were formed, the ink dots were pre-baked at 90° C. for 20 minutes and then baked at 200° C. for 30 minutes.

Example 2

The steps up to formation of the color ink dots in the color pixel portions were performed in the same manner as in Example 1.

A light transmitting ink having the same composition as in Example 1 was ejected on G and B color pixel portions so that the dry thicknesses of the G and B pixel portions are 0.29 μm and 0.19 μm, respectively, to form light transmitting ink dots. No light transmitting ink dot was formed on R color pixel portions.

Example 3

A resin composition comprising hydroxypropyl cellulose (HPC-H produced by Nippon Soda) was spin-coated on the same glass substrate with the black matrix formed thereon as that formed in Example 1, and then dried at 90° C. for 10 minutes to form an undercoat layer of 1.2 μm.

R, G and B color inks having the compositions shown in Table 1 were prepared and arranged in openings of the black matrix by using the ink jet heads in the same manner as in Example 1. Specifically, the inks were ejected from the ink jet heads of an ink jet recording apparatus to form ink dots.

The same light transmitting ink as that used in Example 1 was ejected onto the R, G and B color pixel portions so that the dry thicknesses of the R, G and B color portions are 0.07 μm, 0.28 μm and 0.23 μm, respectively, to form light transmitting ink dots.

Example 4

A heat curable resin (Highcoat LC2001, produced by Sanyo Kasei Co., Ltd.) was coated on the upper layer of the same color filter as that formed in Example 2 so that the dry thickness is 0.5 μm, pre-baked at 120° C. for 30 minutes and then baked at 200° C. for 30 minutes, to form a protective layer.

Comparative Example 1

A color filter was produced by the same method as in Example 1 except that no light transmitting ink dot was formed.

Measuirement of Height Differences Between Color Pixel Portions

Height differences in each of the color filters formed in Examples 1 to 4 and Comparative Example 1 were measured by using a feeler type thickness meter (P-10 Profeeler: produced by Tencoal Co.).

Figure 4A:
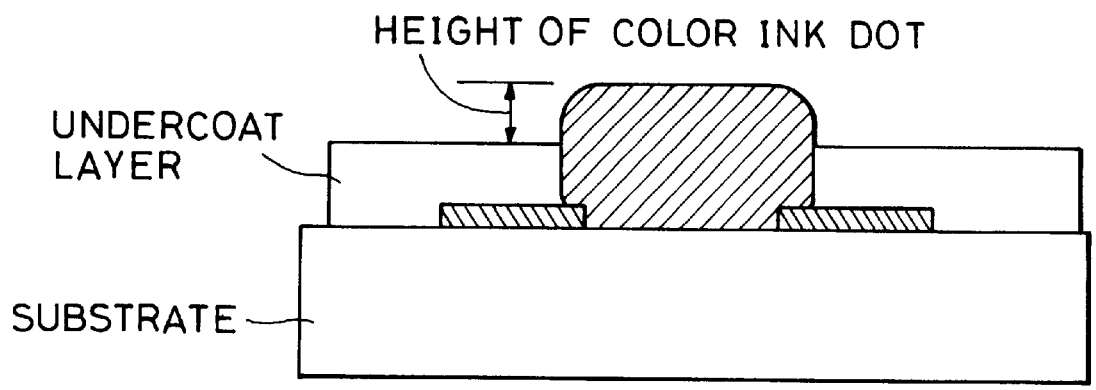
FIGS. 4(a) and 4(b) are a schematic sectional views illustrating measurement of a difference in height of a coloring pixel portion in each of the color filters produced in an example and comparative example, FIG. 4(a) showing measurement of the height of a color ink dot, and FIG. 4(b) showing measurement of the sum of the heights of a color ink dot and light transmitting ink dot.
Figure 4B:
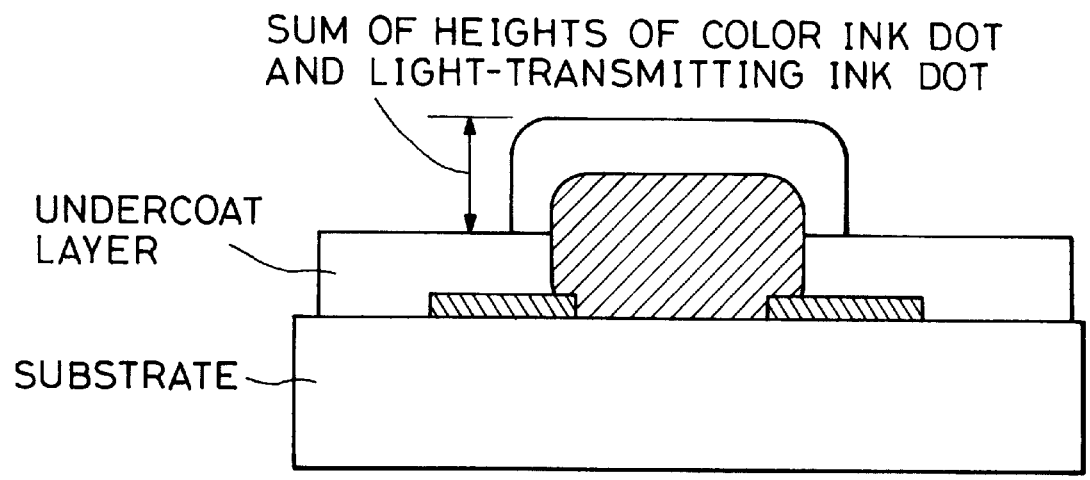

The thicknesses of the color ink dots and the light transmitting ink dots laminated on the color ink dots were measured at the highest points from the undercoat layer formed on the black matrix (refer to FIG. 4). The maximum heights were measured at 50 points of the color dots for each color, and averaged. A height difference between colors was determined by calculating a difference in height between a color having the maximum height and a color having the minimum height. The results of evaluation are shown in Table 3.

When an image was displayed by inputting NYSC system televion signals to the thus-formed liquid crystal display device, troubles such as irregularity in colors and flickering were not observed in the displays respectively comprising the color filters of Examples 1 to 4.

On the other hand, the active matrix liquid crystal display device comprising the filter formed in Comparative Example 1 partially produced irregularity in the colors and flickering.

The results obtained are suammarized in Table 4.

Long-term Driving Test of active Liquid Crystal Display Device

The liquid crystal display devices assembled as described above were driven for 2000 hours in the state wherein the backlight was turned on, and decreases in contrast were measured.

The criteria for evaluation were as follows:

○: A decrease in contrast of less than 5% of the initial value;

Δ: A decrease in contrast of less than 10%; and

×: A decrease in contrast of more than 10%.

The results obtained are shown in Table 4.

As shown in Table 4, the liquid crystal display devices respectively comprising the color filters of Examples 1 to 4 exhibit small decreases in contast, as compared with Comparative Example 1. This is possibly caused by the phenomenon that the light transmitting ink dots formed on the color pixel portions function as protective films to prevent elution of an inhibitor into the liquid crystal from the color pixel portions.

TABLE 3

| | Color ink dot | | | Height difference between colors | Color ink dot + Light transmitting ink dot | | | Height difference between colors |
|---|---|---|---|---|---|---|---|---|
| | R | G | B | | R | G | B | |
| Example 1 | 0.86 | 0.45 | 0.53 | 0.41 | 0.91 | 0.76 | 0.80 | 0.15 |
| Example 2 | 0.86 | 0.45 | 0.53 | 0.41 | 0.86 | 0.74 | 0.72 | 0.14 |
| Example 3 | 0.73 | 0.41 | 0.52 | 0.32 | 0.80 | 0.69 | 0.75 | 0.11 |
| Example 4 | 0.86 | 0.45 | 0.53 | 0.41 | 0.91 | 0.76 | 0.80 | 0.14 0.05* |
| Comparative Example 1 | 0.86 | 0.45 | 0.53 | 0.41 | | | | |

The unit is μm.
*The height difference between colors was measured for the dots including the protective film.

Assembly of Liquid Crystal Display Device

An active matrix type liquid crystal display device was produced by using each of the color filters formed in Examples 1 to 4 and Comparative Example 1.

A thin film transistor and pixel electrodes were formed on a glass substrate in correspondence with R, G and B patterns which formed the pixels of the color filter, and a polyimide oriented film was then provided to form a so-called active martix substrate. A transparent conductive film of ITO and a polyimide oriented film were formed on the color filter to form a couter substrate.

The active matrix substrate and the counter substrate were bonded together with a sealing agent therbetween, and a TN (Twisted Nematic) liquid crystal was sealed in the gap between both substrates. Polarizing plates were disposed on both sides of the substrates in which the liquid crystal was sealed, and a cold cathode type plane fluorescent lamp was disposed on the side of the active matrix substrate to form a liquid crystal display device.

The liquid crystal display device comprising the filter of Example 2 had the R color pixel portions without the light transmitting ink dots formed thereon, and thus exhibited a decrease in contrast slightly greater than the decreases in the display devices of the other Examples.

TABLE 4

| | Irregularity in color, flickering[1] | Decrease in contrast after long-term lighting test[2] |
|---|---|---|
| Example 1 | ○ | ○ |
| Example 2 | ○ | Δ |
| Example 3 | ○ | ○ |
| Example 4 | ○ | ○ |

TABLE 4-continued

|  | Irregularity in color, flickering[1] | Decrease in contrast after long-term lighting test[2] |
|---|---|---|
| Comparative Example 1 | × | × |

[1]Criteria for decision of irregularity in color and flickering
  ○: No irregularity in color and flickering was observed with eyes.
  ×: Irregularity in color and flickering were observed with eyes.
[2]Criteria for decision of decreases in contrast
  ○: less than 5% of the initial value
  Δ: less than 10% of the initial value
  ×: more than 10% of the initial value

Examples 5 to 9

Figure 5A:
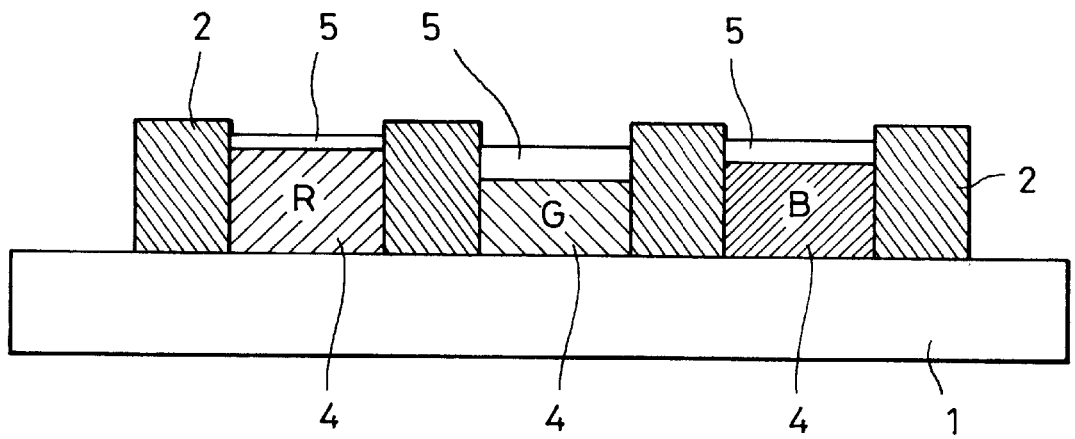
FIGS. 5(a) and 5(b) are a schematic partially sectional views illustrating different color filters in accordance with a further embodiment of the present invention.

The examples are described with reference to FIG. 5(*a*).

A resin (FH-2030, produced by Fuji Hunt) was spin-coated on an alkali-free glass substrate having a polished surface, at 1500 rpm for 15 seconds, and then pre-baked on a hot plate at 120° C. for 90 seconds.

After the glass substrate was then exposed to light through a mask with 500 mJ/cm$^2$, the glass substrate was subjected to development at 30° C. for 60 seconds, washed under high pressure and then baked at 40° C. for 40 minutes to form a black matrix 2 thereon.

R, G and B color inks 4 having the compositions shown in Table 5 were prepared and arranged in the openings of the black matrix 2 by using ink jet heads. Specificaily, after ink dots were formed, the ink dots were pre-baked at 90° C. for 20 minutes and then baked at 230° C. for 30 minutes.

TABLE 5

| Ink composition | Parts by weight |
|---|---|
| Ethylene glycol | 10% |
| Diethylene glycol | 15% |
| Pigments [1] | refer to Table 7 |
| Styrene-maleic acid resin monoethanol amine salt (average molecular weight: 30000, acid value 300) | 0.6% |
| Water | balance |

[1] Red pigment: A mixture of C.I. Pigment Red 168 and C.I. Pigment Orange 36 at 23:8
Green pigment: A mixture of C.I. Pigment Green 36 and C.I. Pigment Yellow 83 at 15:4
Blue pigment: A mixture of C.I. Pigment Blue 60 and C.I. Pigment Violet 23 at 9:3

Each of the inks was dispersed by a sand mill and filtered with a 1-$\mu$m filter before use.

After regular baking, height differences between the colored portions were measured by the method below.

A light transmitting ink 5 having the composition shown in Table 6 was prepared and ejected on the colored pixel portions from the ink jet head so that the dry thicknesses of the R, G and B colored portions are respectively the values shown in Table 7.

TABLE 6

| Light transmitting ink composition | Parts by weight |
|---|---|
| Ethylene glycol | 10% |
| Diethylene glycol | 15% |
| Styrene-maleic acid resin monoethanolamine salt (average molecular weight; 30000, acid value 300) | 2% |
| Water | 70% |
| Isopropyl alcohol | 3% |

TABLE 7

| | Height difference between colors ($\mu$m) | Concentration of pigment (%) | | | Pixel height (height of light transmitting ink) ($\mu$m) | | |
|---|---|---|---|---|---|---|---|
| | | R | G | B | R | G | B |
| Example 5 | 0.09 | 3 | 5 | 4 | 1.00 (0.22) | 0.91 (0.45) | 0.95 (0.27) |
| Example 6 | 0.14 | 4 | 5 | 4 | 1.08 (0.23) | 0.94 (0.48) | 0.95 (0.27) |
| Example 7 | 0.19 | 4 | 4 | 4 | 1.08 (0.23) | 0.89 (0.49) | 0.95 (0.27) |
| Example 8 | 0.20 | 5 | 4 | 5 | 1.13 (0.22) | 0.93 (0.53) | 1.05 (0.23) |
| Example 9 | 0.28 | 6 | 3 | 5 | 1.19 (0.23) | 0.91 (0.53) | 1.05 (0.23) |
| Comparative Example 2 | 0.32 | | | | 0.78 | 0.46 | 0.68 |
| 3 | 0.39 | | | | 0.85 | 0.46 | 0.68 |
| 4 | 0.45 | | | | 0.85 | 0.40 | 0.68 |
| 5 | 0.51 | | | | 0.91 | 0.40 | 0.82 |
| 6 | 0.58 | | | | 0.96 | 0.38 | 0.82 |

After the ink dots were formed, the ink dots were pre-baked at 90° C. for 20 minutes, and then baked at 230° C. for 30 minutes.

Comparative Examples 2 to 6

Color filters shown in Table 7 were produced by the same method as in Examples 5 to 9 except that no light transmitting ink dot was formed.

Measurement of Height Difference Between Color Pixel Portions

Height differences between colors in the color filter formed in each of the examples and the comparative examples were measured by using a feeler type thickness meter (P-10 Profeeler: produced by Tencoal Corp.)

The heights were measured by the following method.

(1) Measuring the height of the black matrix from the substrate.

(2) Measuring a difference in height between the top of the black matrix and the top of a color ink dot.

(3) Determining the height of the color ink dot by (1) –(2).

(4) Measuring a difference in height between the top of the black matrix and the top of a light transmitting ink dot.

(5) Determining the height of the light transmitting ink dot by (2)–(4).

The heights of the color ink dots and the sum of heights of (color ink dots+ light transmitting ink dots) were measured at 50 points for each of the colors, and averaged. A height difference between colors was determined by calculating a difference in height between a color having the maximum height and a color having the minimum height.

Figure 5B:
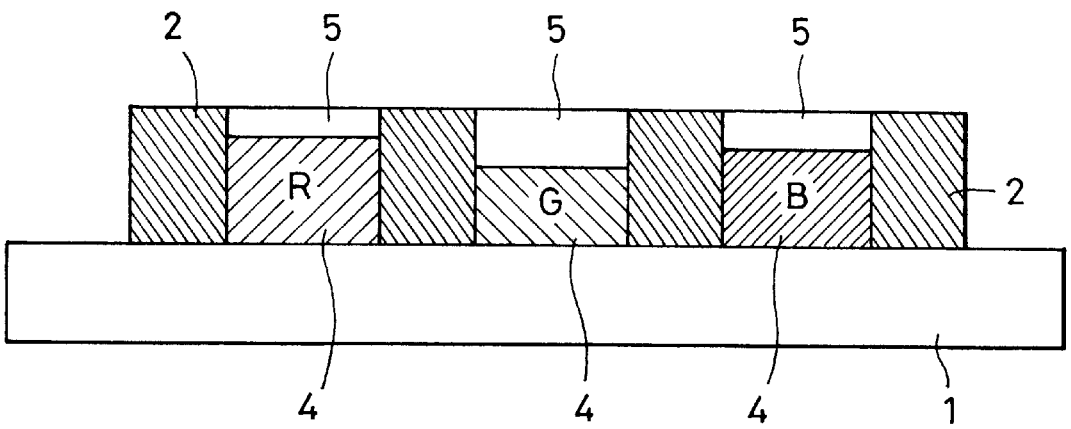

A long-term driving test of an active liquid crystal display device was carried out in the same manner as in Examples 1 to 4 and Comparative Example 1. The results obtained are shown in Table 8. The results shown in Table 8 clearly indicate that the liquid crystal display device provided with the color filter of the present invention is extremely excellent in irregularity in colors, flickering and contrast, as compared with the liquid crystal display provided with a color filter without the light transmitting dots, as in the above Examples 1 to 4. Although, in each of these examples, the color filter shown in FIG. 5(a) was formed, the color filter shown in FIG. 5(b) can be formed. The color filter shown in FIG. 5(b) is different from the color filter shown in FIG. 5(a) in the height of the black matrix 2. However, the color filter shown in FIG. 5(b) is convenient to even the filter because the height of the black matrix 2 is the same as the heights of the pixel portions and the light transmitting ink portions 5.

TABLE 8

|  | Irregularity in color, flickering[1] | Decrease in contrast after long-term lighting test[2] |
|---|---|---|
| Example 5 | ○ | ○ |
| 6 | ○ | ○ |
| 7 | ○ | ○ |
| 8 | ○ | ○ |
| 9 | Δ | ○ |
| Comparative Example 2 | × | Δ |
| 3 | × | Δ |
| 4 | × | Δ |
| 5 | × | Δ |
| 6 | × | Δ |

[1]Criteria for irregularity in color and flickering
   ○: No irregularity in color and flickering was observed with the eyes.
   ×: Irregularity in color and flickering were observed with the eyes.
[2]Criteria for decrease in contrast
   ○: less than 5% of the initial value
   Δ: less than 10% of the initial value
   ×: more than 10% of the initial value

What is claimed:

1. A color filter comprising:
   a plurality of colored members as pixel portions respectively comprising dots of a plurality of color inks having different spectral characteristics; and
   light transmitting ink dots other than the color ink dots, which form light transmitting layers on the pixel portions, wherein the light transmitting layers formed on the pixel portions all have substantially the same height and the light transmitting layers are isolated.

2. A color filter according to claim 1, wherein the plurality of pixel portions have respectively predetermined colors, and are arranged in patterns for the respective colors on a substrate.

3. A color filter according to claim 1 or 2, wherein the pixel portions are formed in predetermined regions of an undercoat layer, which have the ink absorbing ability, the undercoat layer being formed on the substrate.

4. A color filter according to claim 3, wherein the pixel portion parttern of said undercoat layer is formed by photocuring the undercoat layer comprising a photosensitive resin composition using a predetermined pattern.

5. A color filter according to claim 4, wherein the photosensitive resin composition contains an acrylic copolymer.

6. A color filter according to claim 2, wherein each of the plurality of pixel portions is colored to one of red (R), green (G) and blue (B).

7. A color filter according to claim 6, wherein differences between the top heights of the light transmitting ink dots on the respective pixel portions are not more than 0.3 μm.

8. A color filter according to claim 7, wherein differences between the top heights of the light transmitting ink dots on the respective pixel portions are not more than 0.1 μm.

9. A color filter according to claim 1, wherein the plurality of colored members comprising the color ink dots are formed directly on the substrate without the undercoat layer having the ink absorbing ability therebetween.

10. A liquid crystal display device comprising:
    a first substrate provided with a color filter of claims 1, 2, 6, or 9;
    a second substrate opposite to the first substrate; and
    a liquid crystal material disposed between both substrates.

11. A method of producing a color filter comprising the steps of:
    forming a plurality of color ink dots having different spectral characteristics on a substrate using an ink jet process to form a plurality of pixel portions; and
    forming light transmitting ink dots other than the color ink dots using the ink jet process to form light transmitting layers on the pixel portions, wherein the light transmitting layers formed on the pixel portions all have substantially the same height and the light transmitting layers are isolated.

12. A method according to claim 11, wherein the color ink dots having predetermined colors are respectively formed in the plurality of pixel portions which are arranged in patterns for the respctive colors on a substrate.

13. A method according to claim 12, wherein an undercoat layer is formed on the substrate, and regions which have the ink absorbing ability in a predetermined pattern are formed in the undercoat layer, the pixel portions being respectively formed in the regions having the ink absorbing ability.

14. A method according to claim 13, wherein a layer of a photosensitive resin composition is formed on the substrate and photocured in a predetermined pattern to form the undercoat layer having the regions with the ink absorbing ability in the predetermined pattern.

15. A method according to claim 14, wherein the photosensitive resin composition contains an acrylic copolymer.

16. A method according to any one of claims 12 to 15, wherein each of the plurality of pixel portions is colored to one of red (R), green (G) and blue (B).

17. A method according to claims 11 to 15, wherein the thickness of the light transmitting ink dot formed on each of the pixel portions is controlled so that the light trasmitting ink dots on the pixel portions have substantially the same height.

18. A method according to claim 17, wherein the heights of the light transmitting ink dots are controlled by adjusting the amount of the light transmitting ink applied.

19. A method according to claim 17, wherein differeneces between the top heights of the light transmitting ink dots on the respective pixel portions are not more than 0.3 μm.

20. A method according to claim 19, wherein differeneces between the top heights of the light transmitting ink dots on the respective pixel portions are not more than 0.1 μm.

21. A method according to claim 16, wherein said color ink dots are formed using an ink which is not liquified until heat energy is applied thereto.

* * * * *

UNITED STATES PATENT AND TRADEMARK OFFICE
CERTIFICATE OF CORRECTION

PATENT NO. : 6,341,862 B1
DATED : January 29, 2002
INVENTOR(S) : Takeshi Miyazaki et al.

It is certified that error appears in the above-identified patent and that said Letters Patent is hereby corrected as shown below:

Title page,
Item [56] References Cited: FOREIGN PATENT DOCUMENTS,
 "54056847" should read -- 54-056847 --.
 "59123670" should read -- 59-123670 --
 "59138461" should read -- 59-138461 --
 "60071260" should read -- 60-071260 --
 "188801" should read -- 1-88801 --
 "181216" should read -- 3-181216 --

Column 1,
Line 14, "is" should be deleted ;
Line 19, "etc." (close up right margin);
Line 20, "Of" (close up left margin);
Line 32, "matrixm"" should read -- matrix" --; and
Line 41, "a" should read -- an --.

Column 3,
Line 1, "a" should be deleted;
Line 8, "there" should read -- thereof; --;
Line 12, "a" should be deleted; and
Line 19, "a" should be deleted.

Column 5,
Line 41, "substrate10'" should read -- substrate 22 --.

Column 9,
Line 14, "Measuirement" should read -- Measurement --;
Line 57, "martix" should read -- matrix --;
Line 59, "couter" should read -- counter --; and
Line 61, "therbetween," should read -- therebetween, --.

Column 10,
Line 9, "active" should read -- Active --.

Column 11,
Line 31, "Specificailly," should read -- Specifically, --.

UNITED STATES PATENT AND TRADEMARK OFFICE
CERTIFICATE OF CORRECTION

PATENT NO.   : 6,341,862 B1
DATED        : January 29, 2002
INVENTOR(S)  : Takeshi Miyazaki et al.

It is certified that error appears in the above-identified patent and that said Letters Patent is hereby corrected as shown below:

Column 13,
Line 47, "and are arranged in patterns for the respective colors" should read -- arranged in regular patterns --;
Line 48, "substrate." should read -- substrate, wherein there is substantially no said light transmitting ink layer between the pixel portions. --;
Line 54, "parttern" should read -- pattern --.

Column 14,
Line 28, "which are arranged in" should read -- and are arranged in regular --;
Line 29, "for the respective colors on a substrate." should read -- on a substrate, wherein there is substantially one said light transmitting ink layer between the pixel portions. --;
Line 53, "differeneces" should read -- differences --; and
Line 56, "differeneces" should read -- differences --.

Signed and Sealed this

Twenty-eighth Day of May, 2002

Attest:

JAMES E. ROGAN
*Attesting Officer*   *Director of the United States Patent and Trademark Office*